Patented Aug. 7, 1923.

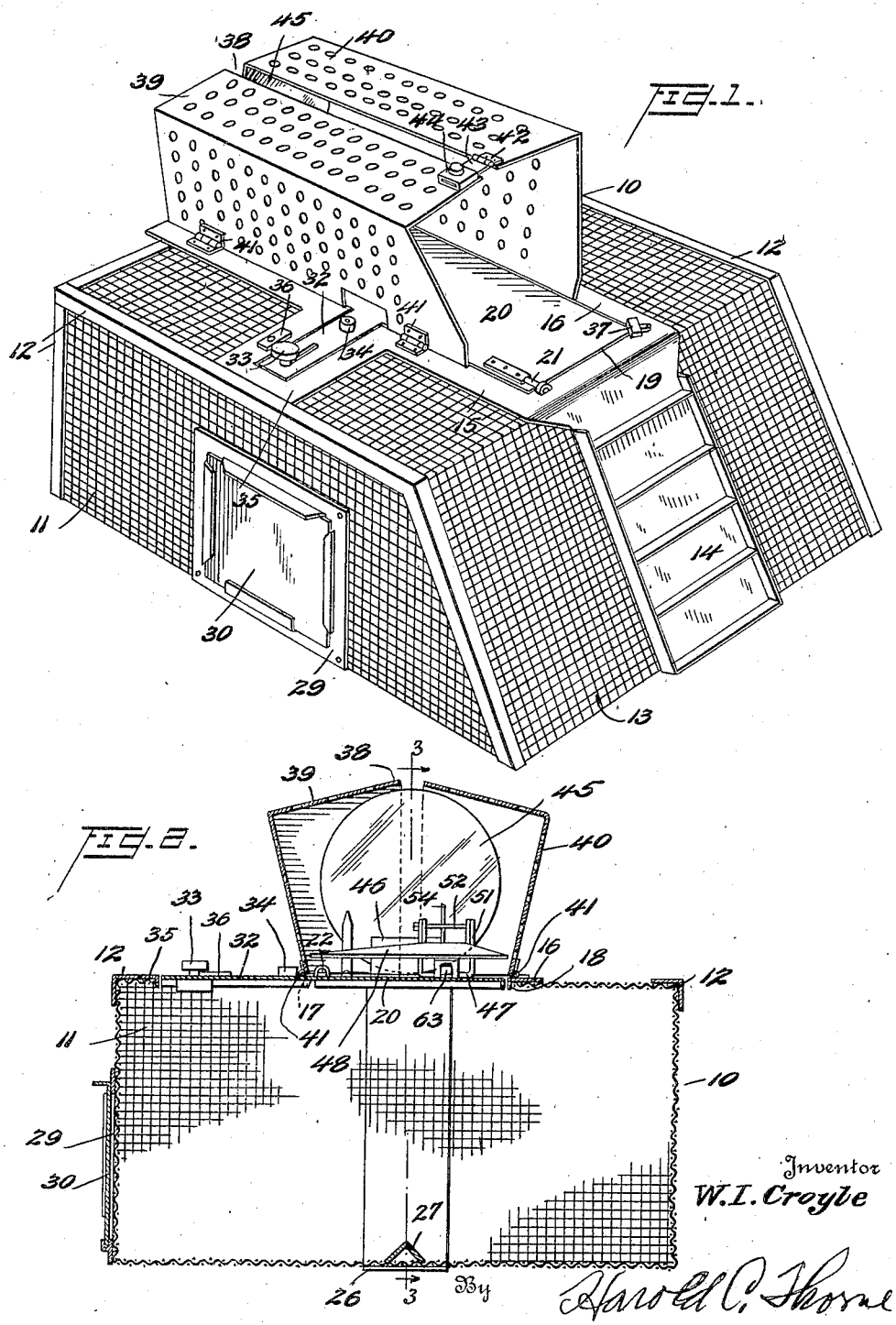

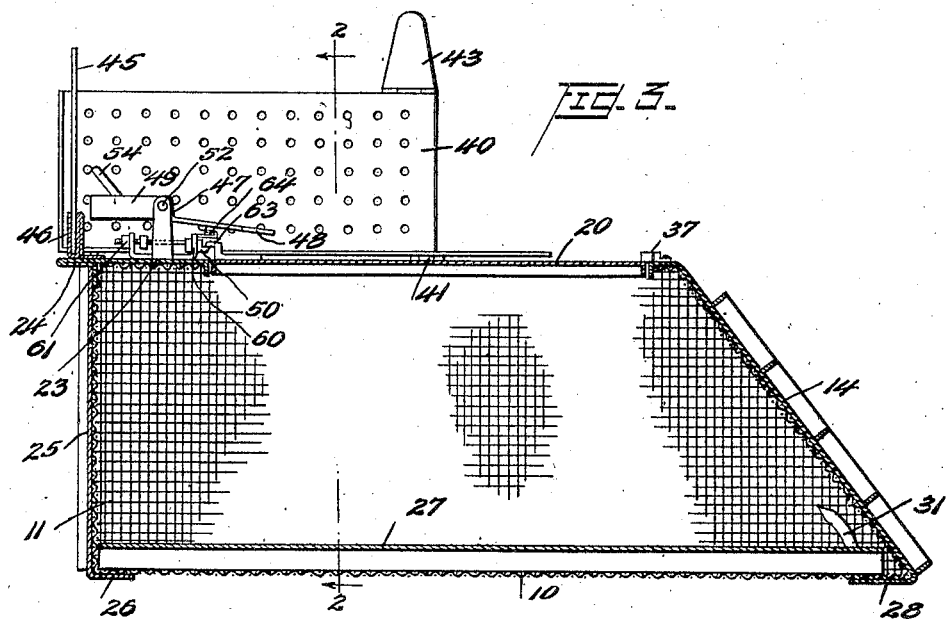
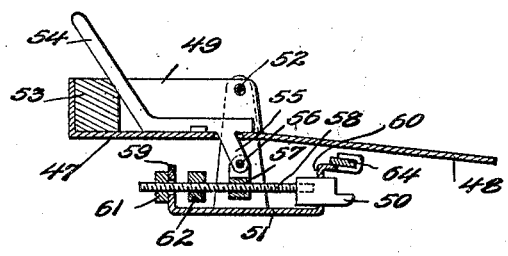
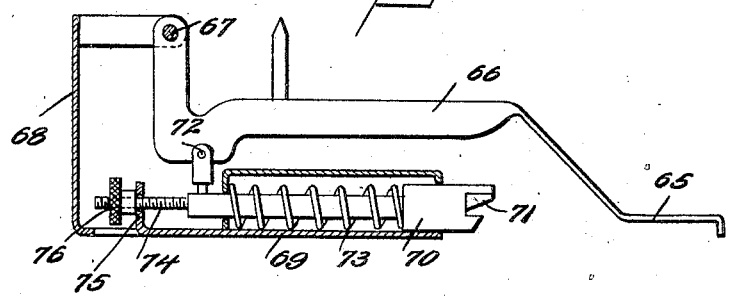

1,463,874

UNITED STATES PATENT OFFICE.

WILLIAM I. CROYLE, OF HEILWOOD, PENNSYLVANIA.

TRAP.

Application filed March 24, 1922. Serial No. 546,243.

*To all whom it may concern:*

Be it known that WILLIAM I. CROYLE, a citizen of the United States, residing at Heilwood, in the county of Indiana and State of Pennsylvania, has invented certain new and useful Improvements in Traps, of which the following is a specification.

This invention relates to animal traps, and particularly to improvements in traps such as disclosed in the patent to applicant granted August 9, 1921, Number 1,387,129.

The objects and details of construction will appear as described in connection with the accompanying drawings and hereinafter set forth and claimed.

Referring to the drawings forming a part of this specification, like characters of reference designate corresponding parts in the figures, in which,—

Figure 1 is perspective view of a trap constructed in accordance with this invention, Figure 2 is a vertical cross-sectional view taken on line 2—2 of Figure 3, Figure 3 is a longitudinal vertical sectional view of the trap taken on line 3—3 of Figure 2 showing one of the hood members swung down onto the top of the trap closure, Figure 4 is an enlarged detail view of a trip pedal, showing a bait-hook, meal tray and bolt operated by the pedal, and Figure 5 is a similar view of a modified form of trip pedal and bolt operating mechanism.

Referring to the drawings, the trap is generally designated by the reference numeral 10, and preferably comprises a mesh closure 11 made from a blank and formed into a box construction fastened together at the meeting edges of its sides and top by metallic angle strips 12 as disclosed in the patent referred to. The inclined front end 13 has a cleated platform 14 leading to and preferably formed integral with horizontal side strips 15 and 16 having angularly bent portions 17 and 18 secured to edges of the meshing around the opening 19 in which is mounted a tilting platform 20 similar in construction to the one in the aforementioned patent and pivotally mounted at 21 and 22 adjacent to one side of the opening 19.

Strips 15 and 16 preferably extend to the rear end of the trap and are there formed with a cross member 23 which is likewise angularly bent as at 24 and a channel member 25 is secured to these members and to the rear end of the trap, extending to the bottom thereof with its lower end bent underneath the closure as at 26. A V-shaped strip 27 is positioned within the closure and secured to the bottom thereof, to the member 25 at 26 and likewise to the platform 14 to a portion 28 bent under the front end of the closure. The closure thus constructed is quite rigid and is still very light in weight.

The closure is provided with an outlet 29 normally closed by a door 30, and it may also have a bait-hook 31 inside the trap for supporting meat or other bait, if desired.

The platform 20 is shown as having a projection 32, for carrying a weight 33 and a buffer 34. This construction requires that the opening 19 should be formed so as to receive it and that strip 15 would necessarily be broken or shaped as at 35 to surround the projection 32. A safety button or platform lock 36 is pivoted to the portion 35 and is adapted to hold the platform 20 from being tilted when the button is turned so as to engage the projection 32. A stop and buffer 37 is secured to strip 16 which is engaged by a corner of the platform to limit its upward movement.

A hood 38 comprising a pair of sheet metal members 39 and 40 perforated or formed from wire mesh and fastened to the strips 15 and 16 by means of hinges 41 whereby they may be folded over onto the top of the closure, and preferably they are formed so that the tops and rear ends will collapse so as not to project substantially above the top of the closure. A hinge 42 is secured to the top of the hood member 40 and is provided with a tongue 43 which is adapted to extend into a clamp 44 on the top of the complemental hood member 39 as shown in Figure 1, thus securing the two together. The hood members then may be used as a handle for carrying the trap, and as will be further noted they are spaced somewhat apart affording a better view from the top through to the inside thereof, particularly where the bait is placed, to the rear of the tilting platform 20.

The hood encloses a round mirror 45 which is mounted in a bracket 46 fastened to the rear portion of member 23.

Member 23 also supports the tripping mechanism 47 for releasing the tilting platform and which comprises a pivotally mounted pedal 48 and bait tray 49 and reciprocatory bolt 50 mounted in a frame structure 51 secured to the member 23. The pedal 48, as best shown in Figures 2 to 4 inclusive, comprises an inclined platform structure which extends substantially across the space between the hood members. The pedal is contracted rearwardly and formed into a tray 49 which is pivoted at 52. A counterbalancing weight 53 may be positioned in the tray and a hook member 54 for carrying a piece of bait. As best shown in Figure 4, the hook 54 has an extension 55 below the tray 49, and is pivoted at 56 to a collar 57 adjustably positioned on a threaded rod 58 which carries the bolt 50. The bolt 50 and threaded rod 58 are slidingly mounted in apertures through upwardly extending projections 59 and 60 of the frame 51, and the movement of the bolt is limited by means of a pair of stops 61 and 62 preferably of leather or other soft material so as to act as buffers threaded on rod 58 and adjusted to allow the bolt 50 the necessary movement for proper cooperation with a latch 63 on the tilting platform. The projection 60 is slotted and bent forwardly over the end of bolt 50 in a manner to secure a buffer stop 64 against which the latch 63 strikes when the platform returns to its horizontal position.

It will be readily seen that when a mouse or rat depresses the pedal 48 the member 55 will retract bolt 50 and allow the platform to tilt allowing the victim to fall into the closure 11. The tray will tilt back to its normal position and the platform will rise, the latch 63 will pass the bolt 50 striking buffer 64 and then rest in the space between the buffer 64 and the top of the bolt 50 until the next animal operates the pedal. The tray 49 is convenient for carrying meal or grain which will gradually work down on the pedal as it is operated, and a suitable piece of bait can also be placed upon the hook 54.

A slightly modified form of trip pedal and bolt operating mechanism is disclosed in Figure 5. In this structure the pedal 65 extends from an arm 66 which extends rearwardly and is pivoted at 67 to arms from an upward projection 68 of a frame 69 which is adapted to be mounted on the member 23 of the trap. This frame also carries a spring pressed bolt 70 which may be provided with a buffer 71. The bolt has a pivotal connection 72 with the arm 66 whereby upon depressing the pedal the bolt will be retracted against the pressure of the spring 73. Extending rearwardly of the bolt is a threaded rod 74 which passes through a bifurcated projection 75 from the frame, and on the rod to the rear of this projection is threaded a nut 76 whereby the projection of the bolt may be adjusted.

The operation of the bolt 70 is substantially the same as that of bolt 50,—depressing the pedal 65 retracts the bolt and releases the platform latch. When the platform returns its latch passes the lower portion of the bolt and is stopped by the buffer 71, in the same manner as the latch does in the patent referred to. The separate buffer, as disclosed in the form represented in Figure 4 is preferable since there is no possibility of the latch interfering with the bolt returning to its fullest extent after the latch has passed it. However, both forms have been highly satisfactory in their operation.

Having thus disclosed the invention it is not desired to have it limited closely to the specific embodiments shown, it being understood that various changes in form, proportion and organization of parts may be made without departing from the spirit of the invention as indicated by the scope of the following claims.

What is claimed as the invention and is desired to be secured by Letters Patent is:—

1. A trap including a closure member having an entrance in its top, a tilting platform pivotally supported in said entrance, a latch on the tilting platform, a bolt mounted on the top of the trap cooperating with said latch for supporting the platform, and a pedal pivotally mounted on the top of the trap extending over said bolt and latch and having a connection with the bolt between the pivot point of the pedal and its extending end whereby the bolt will be retracted from the latch when the pedal is depressed.

2. In combination with a trap including a tilting platform provided with a latch, a pedal mechanism therefor comprising a trip pedal positioned over said latch and a portion of the platform and pivotally mounted to the rear thereof, a counterbalancing weight for said trip pedal on the other side of the pivot, a bolt slidingly mounted under said pedal and cooperating with the latch on the tilting platform for supporting it in a horizontal position, and a connection between said bolt and said trip pedal between the pivot point of the pedal and its forward end for retracting the bolt when the pedal has been depressed.

3. A pedal operating mechanism for traps comprising a tray pivotally supported adjacent to one of its ends and extending forward to form a trip pedal, a slidingly mounted bolt under said tray and pedal for cooperating with the trap, and a connection between said pivotally mounted tray and pedal and said bolt for reciprocating it upon tilting movement of the pedal.

4. A pedal operating mechanism for traps comprising a tray pivotally supported adjacent to one of its ends and extending forward to form a trip pedal, a slidingly mounted bolt under said tray and pedal for cooperating with the trap, a bait hook extending upwardly from the tray and downwardly from the bottom thereof and connected at its lower end with said bolt for retracting it when the trip pedal has been depressed, and a weight in said tray for returning the trip pedal and bolt to their normal position.

5. In combination with a trap including a tilting platform provided with a latch, a pedal operating mechanism therefor including a counterbalanced trip pedal, and a reciprocating bolt for supporting the platform having a connection with said pedal, and a stop member mounted in a relation with said bolt so as to be engaged by said latch upon the closing movement of the tilting platform.

6. In combination with a trap including a closure member having an entrance through its top, a hood positioned over said entrance comprising a pair of separated cover members hinged on either side of the entrance, and having clamping members adjacent to the tops of said members for securing them in an upright position.

7. In a trap including a closure member having an entrance in its top with a tilting platform in the entrance, a pedal pivotally mounted on the top of the trap and extending over said platform, a bolt mounted on said top under the pivot of said pedal and engaging said platform, and a connection between said pedal and said bolt substantially under the pivot for the pedal for retracting the bolt from the platform when the pedal is depressed.

In testimony whereof he affixes his signature.

WILLIAM I. CROYLE.